US007099952B2

(12) United States Patent
Wong et al.

(10) Patent No.: US 7,099,952 B2
(45) Date of Patent: Aug. 29, 2006

(54) TRANSPORTABLE IDENTIFIER AND SYSTEM AND METHOD TO FACILITATE ACCESS TO BROADCAST DATA

(75) Inventors: Curtis G. Wong, Bellevue, WA (US); Steven M. Drucker, Bellevue, WA (US); Craig J. Mundie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 09/894,327

(22) Filed: Jun. 28, 2001

(65) Prior Publication Data

US 2003/0002536 A1    Jan. 2, 2003

(51) Int. Cl.
*G06F 13/00* (2006.01)
(52) U.S. Cl. ...................... 709/231; 709/236; 709/245; 709/250
(58) Field of Classification Search ................ 709/217, 709/219, 231, 238, 250; 719/313, 316, 317, 719/328
See application file for complete search history.

(56) References Cited

U.S. PATENT DOCUMENTS

| 5,990,883 | A  |   | 11/1999 | Byrne et al. |
| 6,016,497 | A  |   | 1/2000  | Suver |
| 6,023,585 | A  |   | 2/2000  | Perlman et al. |
| 6,034,689 | A  |   | 3/2000  | White et al. |
| 6,256,071 | B1 | * | 7/2001  | Hiroi ........................... 348/553 |
| 6,418,169 | B1 | * | 7/2002  | Datari .................... 375/240.28 |
| 6,446,262 | B1 | * | 9/2002  | Malaure et al. ............. 725/141 |
| 6,675,385 | B1 | * | 1/2004  | Wang ........................... 725/39 |
| 6,804,528 | B1 | * | 10/2004 | Laroia et al. ............... 455/503 |
| 6,813,776 | B1 | * | 11/2004 | Chernock et al. ............. 725/58 |

2002/0194585 A1 * 12/2002 Connelly ........................ 725/9

OTHER PUBLICATIONS

"Press Release," ReplayTV, Inc., http://www.replaytv.com/news/pressrelease18htm (Aug. 10, 2000).
Hause, Kevin, "Digital Video Recorders: The Next Big Thing?" Abstract, International Data Corporation, Report, No. 19588, Jul. 1999.
"Press Release," TiVo, Inc., http://www.tivo.com/about/061400.html (Jul. 20, 2000).
"Press Room," Replay TV, http://www.replaytv.com/news/pressroom.htm (Jul. 20, 2000).
"MbTV Your Thumbprint on TV," MetaByte TV, http://www.mbtv.com/index.htm (Jul. 20, 2000).
"NDS The Company," Website Home Page, http://www.nds.com/thecompany/ndsthecompany.htm (Jul. 20, 2000).
Lewis, Michael, "Boom Box," http://www.nytimes.com/library/magazine/home/20000813mag-boombox.html (Aug. 14, 2000).
Morris, John and Josh Taylor, "ZDNet: Hits & Hype," ZDNet Reviews, http://www.zdnet.com/products/stories/reviews/0,4161,2619461,00.html (Oct. 9, 2000).

* cited by examiner

*Primary Examiner*—Viet D. Vu
(74) *Attorney, Agent, or Firm*—Amin & Turocy, LLP

(57) ABSTRACT

A system and method are disclosed which enable a user to locate target data from a temporal broadcast of data. The system includes a transportable identifier that represents the target data. The identifier further includes metadata that provides sufficient information about the broadcast of the target data such that the target data can be acquired when broadcast. The transportable identifier further may be sent to one or more other users to enable such users to locate the broadcast of the target data. As a result, one or more users may employ identifiers to locate the broadcast of the target data and, in turn, monitor and/or store the target data from the temporal broadcast.

26 Claims, 7 Drawing Sheets

TRANSPORTABLE IDENTIFIER AND SYSTEM AND METHOD TO FACILITATE ACCESS TO BROADCAST DATA

TECHNICAL FIELD

The present invention relates generally to computer programming and, more particularly, it relates to a transportable identifier and system and method to facilitate access to broadcast data.

BACKGROUND OF THE INVENTION

Information is distributed in a variety of ways, usually in dependence upon the type of information and the equipment being used to send and receive such information. For example, radio, television and cable networks distribute information by broadcasting signals over predetermined channels in corresponding media. Such broadcasters typically deliver programming according to fixed program schedules to enable users to receive desired program content. Despite best efforts, however, events sometime occur that cause programs to be shifted in time.

Multimedia information has been increasing with the evolution of the Internet and other communication infrastructures. Some multimedia information is available by downloading data files. Other multimedia applications require real-time communications of data, commonly referred to as streaming. While streaming data mitigates the need to completely download large files or take up large amounts of disk storage space to utilize the data, in a manner similar to conventional broadcasting, streaming presents various continuity issues. For example, the success associated with streaming data can vary depending on the available bandwidth and interruptions in the data stream.

In order to facilitate streaming of data over communication frameworks, such as the Internet, various protocols have been developed. For example, the Internet Engineering Task Force (IETF) has developed enhanced Internet integrated service models, such as Resource ReServation Protocol (RSVP), Realtime Transport Protocol (RTP), and RealTime Streaming Protocol (RTSP). It is anticipated that these and other protocols will continue to evolve to facilitate realtime broadcast of data over the Internet. It is contemplated that the continued efforts also will continue to expand such broadcasts to wireless communication frameworks.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a transportable identifier that includes metadata identifying a temporal broadcast of target data. The identifier, which may be distributed to one or more users, can be employed to locate the broadcast of the target data based on the associated metadata. A user can, in turn, monitor and/or store the target data as it is broadcast. By way of illustration, the broadcast data can include audio data, visual data, data indicative of one or more monitored conditions (e.g., sensory output data), and/or other types of data.

A system implementing the present invention can receive broadcast data, including the target data identified by the identifier, over any type of broadcast medium. For example, the data can be distributed via broadband, cellular, satellite, computer network infrastructures (LAN, WAN, etc.), as well as via other types of wired and wireless data communication systems. The metadata of the identifier further includes information to enable the target data to be located for each respective data source that may provide part of the target data.

According to one aspect of the present invention, an identifier represents a temporal presentation of selected data over one or more data streams, such as may include analog and/or digital data over an associated medium. The identifier enables a user of the identifier to locate when and over which data stream(s) the selected data is broadcast, such that the content of the selected data can be monitored and/or stored.

The identifier can be transported to one or more users, such that each user can locate a broadcast of the selected data. As a result, a holder of the identifier can employ the identifier to monitor and/or record corresponding data during one or more subsequent broadcasts.

Another aspect of the present invention provides a system to facilitate monitoring and/or recording of temporally presented data. One or more data collection systems collect data, which data might correspond to an event, an entity, a monitored condition, etc. An identification system can be associated with each of the data collection systems and operative to stamp portions of the collected data based at least in part on time, an event and/or an entity. The stamp can include identifying data associated with portions of the collected data that, for example, represent the occurrence of scheduled times when the data is collected, a preselected event, and/or the presence (or absence) of an entity relative to some spatial region. An aggregator aggregates portions of the stamped data, such as based on the identifying data associated with the stamped data. A transportable object is provided to enable a user to locate a broadcast of at least some of the aggregated data to facilitate monitoring and/or storing of such data as it is broadcast.

In accordance with a particular aspect, an additional data processing mechanism can be associated with the aggregator to segment selected portions of the collected data into different groups based on the stamp associated with such data. Different groups of the segmented data may then be broadcast at different locations and/or at different times, such that a given identifier can identify the location that broadcasts one or more groups of the segmented data.

Another aspect of the present invention provides a method to facilitate monitoring and/or recording of data presented via a broadcast medium. The method includes receiving a transportable object that corresponds to a future presentation of associated data. The identifier, for example, includes metadata associated with a scheduled broadcast of the associated data and/or otherwise identifies the content of the broadcast. The transportable object can then be employed to locate the presentation of the associated data, such that a user can monitor and/or store the data as it is presented.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention provides a system and method to enable a user to locate target data from a temporal presentation of data. A transportable object or identifier, represents the target data. The object or identifier includes metadata that defines the location of the temporal presentation of target data so that the target data can be located. A user thus can employ the object to locate corresponding target data and, in turn, monitor and/or store the target data from the temporal presentation of data. In accordance with a particular aspect, the temporal presentation of data, including the target data, may occur independently from whether a user employs an object to locate such data.

Figure 1:
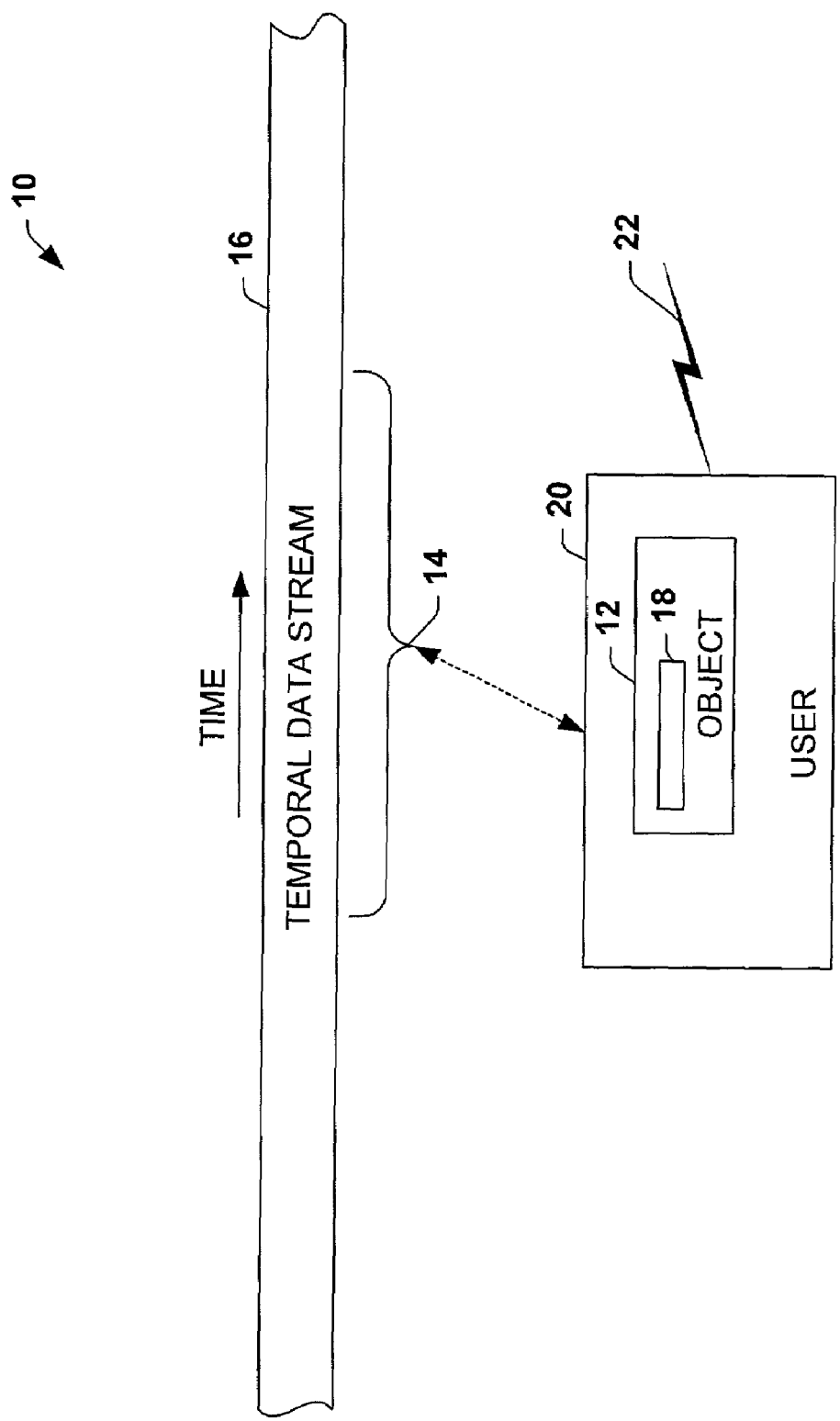
FIG. 1 illustrates an example in which an object is implemented to locate data in accordance with the present invention.

FIG. 1 schematically illustrates an implementation 10 in which a transportable object 12 is utilized to locate a future broadcast of target data 14, such as may be transmitted in a data stream 16. The object 12 represents the target data 14 and includes metadata 18 that enables a user 20 of the object to locate the broadcast of the target data in the data stream 16. The target data 14 may include part of the data being broadcast or it may form the entire stream, such as may have a defined beginning and end. The data stream 16, for example, includes data that has been encoded for transmission over a corresponding medium, such as may include wired and/or wireless media.

The data stream 16 includes data that is transmitted as a function of time (e.g., a temporal broadcast) and may be concurrently accessible by any number of one or more users. However, it is to be appreciated that the broadcast of the data 16, including the target data 14, may occur independently of the user 20 accessing such data. The temporal data stream 16 can broadcast data content via any suitable broadcast medium (e.g., broadband or digital cable, satellite, computer network infrastructures, etc.). In general, the source (not shown) of the broadcast data 16 varies according to the type of medium over which the data broadcast. Similarly, the type and content of data that is broadcast in the stream 16 further can vary based on the source of the data stream and the type of information that is being conveyed. For example, the data provided in the broadcast data stream 16 could include audio, video, audio and video, sensor data (e.g., detected by one or more sensors), and/or any other information that may be encoded in an analog or digital form suitable for broadcast over associated broadcast media.

Accordingly, the metadata 18 can generally identify the target data 14, which may be broadcast over a corresponding time period using one or more media, or the metadata can specifically identify when and where the target data is broadcast over a particular broadcast medium. In certain circumstances, the object also can include authenticating data to enable user-access to generally private target data.

For example, if the target data 14 is broadcast by streaming data over the Internet (or another network), the metadata 18 includes a Uniform Resource Locator (URL) indicative of the broadcast location together with other identifying data from which the target data may be accessed during its broadcast. Such identifying data can take many forms depending on the type of data being broadcast, the broadcast medium, and/or how such data was collected. By way of illustration, the identifying data can include an indication of a future time at which the target data is scheduled to be broadcast. Alternatively or additionally, the identifying data could describe the target data in a manner to enable the beginning and end of its broadcast to be detected in the data stream. While a single data stream 16 is illustrated in FIG. 1, those skilled in the art will understand that the target data could be sent over any number of one or more such streams, all of which would be accessible based on the metadata 18 in the object 12. By locating the target data 14, the user or user of the object can monitor and/or record the target data as it is broadcast in the data stream 16.

The user 20 can include any device (hardware or software) capable of communicating data, including the object. For example, the user 20 may be a personal computer, a handheld appliance (e.g., PDA, cellular telephone, etc.), an application running on a computer, or part of an entertainment system that communicates data through an associated communications link 22. The link 22 can be coupled to a Wide Area Network (WAN), such as an intranet or the Internet, or a Local Area Network (LAN). The object 12 can be downloaded from a remote computer, received by subscription, or sent to the user 20 via a mail delivery system. The user 20 further may be able to send the object to one or more other users using the communications link 22. Those skilled in the art will understand and appreciate that the object 12 may be manually stored in the user, such as from an associated removable storage device. The communication of the object to and/or from the user 20 further may occur over the data stream, although separate communication channels also could be employed in accordance with an aspect of the present invention.

Figure 2:
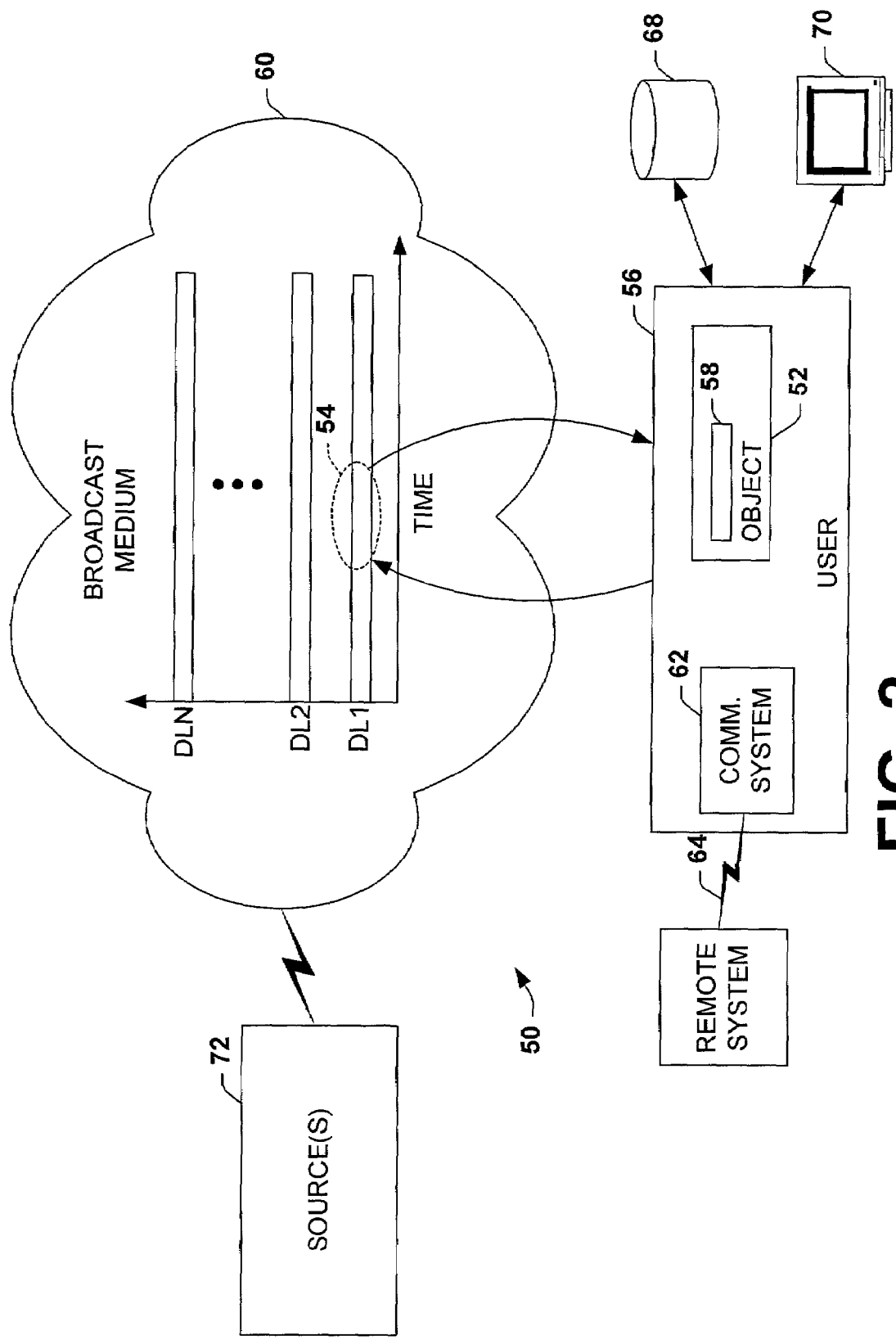
FIG. 2 is another example in which an object is employed to locate data stream transmitted over a broadcast medium in accordance with the present invention.

FIG. 2 illustrates another example of a system 50 implementing a transportable object 52 to locate a broadcast of target data 54 in accordance with an aspect of the present invention. A user 56 of the object 52 employs the object to locate the target data 54 while it broadcast at an associated data location, indicated as Data Location 1 (DL$_1$). The user 56 may be hardware and/or software, such as a computer, an application or service running on a personal computer, an entertainment appliance, a handheld computer, a cellular telephone, or other type of system. The data location may be a channel, such as may have a predetermined frequency and bandwidth, a URL, a series of associated data packets, or any other unit in which information can be broadcast. The object 52 further includes metadata 58 that enables the user

56 to locate the target data as it is broadcast at $DL_1$. In the example of FIG. 2, $DL_1$ is one of several data locations ($DL_1$ to $DL_N$, where N is an integer $\geq 1$) implemented in a broadcast medium, schematically illustrated as 60.

It is to be appreciated that different parts of the target data 54 could be broadcast at different locations and/or at different times in the broadcast medium 60. In addition, different parts of the target data can be broadcast over other broadcast media different from the medium 60. For example, a video portion of audio-visual data can be broadcast over a broadband cable medium while an associated audio portion is broadcast over radio, on a subcarrier frequency with the video portion of the data, and/or streamed via the Internet. In such circumstances, the metadata 58 further would enable each of such locations to be located so that the user can monitor and/or store the component parts of that form the target data 54.

The user 56 also can include a communications device 62, which is operative to establish a communications link 64 between the user and one or more remote devices 66. The communications device 62, which may be a modem, a communications server, a network interface, etc., enables the user 56 to send and/or receive objects and other data relative to the user 56.

Memory 68 also may be associated with the user 56, such as for storing the target data identified by the metadata 58. The memory 68 may include volatile memory (e.g., RAM) and/or non-volatile memory (ROM, Flash, disk drive, floppy disk drive, CD-ROM, etc.). An output device, such as a display 70, also may be associated with the user 56 for providing a graphical and/or audible representation of data received at the user and/or data that may have been stored in the memory 68. The user also can be associated with other types of output devices, such as audio speakers, television, and/or any other appliance capable of converting such data to a human-perceptable form.

One or more sources 72 of data provide data at the locations $DL_1$ to $DL_N$ of the medium 60. The data locations may represent physical locations from where the data is broadcast, channels in a radio frequency spectrum (wired or wireless) over which data is broadcast, or other transmission units by which data may be broadcast. The broadcast data provides a temporal presentation of data that varies over time and which may be received or accessed during broadcast by one or more persons. It is to be appreciated that the information broadcast at the data locations $DL_1$ to $DL_N$, including the target data 54, can occur independently of the user 56 accessing such data.

In one aspect, the target data 45 may require authentication (e.g., a password) to access such data in a readable form. The requisite authentication may be provided as part of the object 52 that represents the target data 54, such as in the metadata 58. Alternatively or additionally, a predetermined password or other authentication scheme may be employed, which may be stored in the memory 68 associated with the user 56. The authentication, for example, includes a key for a decryption algorithm that enables the target data to be properly decoded or demodulated so as to permit such data to be presented in a usable form.

By way of illustration, the target data 54 can correspond to an audio and/or visual program that is scheduled to be broadcast at a particular data location at a future time. The user 56 can obtain the transportable object (or identifier) representing the future broadcast to enable the user to locate the target data when it is broadcast based on the metadata 58 encapsulated in the object 52. As a result, the user 56 can monitor the target data with the output device 70 while it is broadcast via the broadcast medium 60. Alternatively or additionally, the user 56 can store the target data in memory 68 while it broadcast via the broadcast medium 60. Because the object 52 is transportable, the object can be shared with one or more other users to enable similar monitoring and storing of the identified target data as it is broadcast. By storing the broadcast, the system performs a desired time shifting function enabled by the transportable object 52 in accordance with an aspect of the present invention.

In one particular aspect, the object 52 represents a temporal broadcast of sensor data. The sensor data, for example, may be obtained by one or more sensors that monitor conditions associated with a place (e.g., equipment health and operating status in a factory; security surveillance video and alarm conditions for a facility; audio and/or video coverage for a facility and/or event, etc). In such an example, the associated metadata 58 for the object 52 may represent the path or location to desired content, access, broadcast window, as well as scheduling information needed to locate the target sensor data.

In addition or alternatively, the broadcast of the target data can correspond to a live (or time-delayed) real-time delivery of such data. In such circumstances, the object is provided to one or more selected users prior to its associated broadcast to enable the user to locate the target data during its real-time broadcast. Those skilled in the art will understand and appreciate that data can be delivered via the broadcast medium more than one time so that the target data can be located at a convenient time to facilitate monitoring and/or storing of the data.

Figure 3:
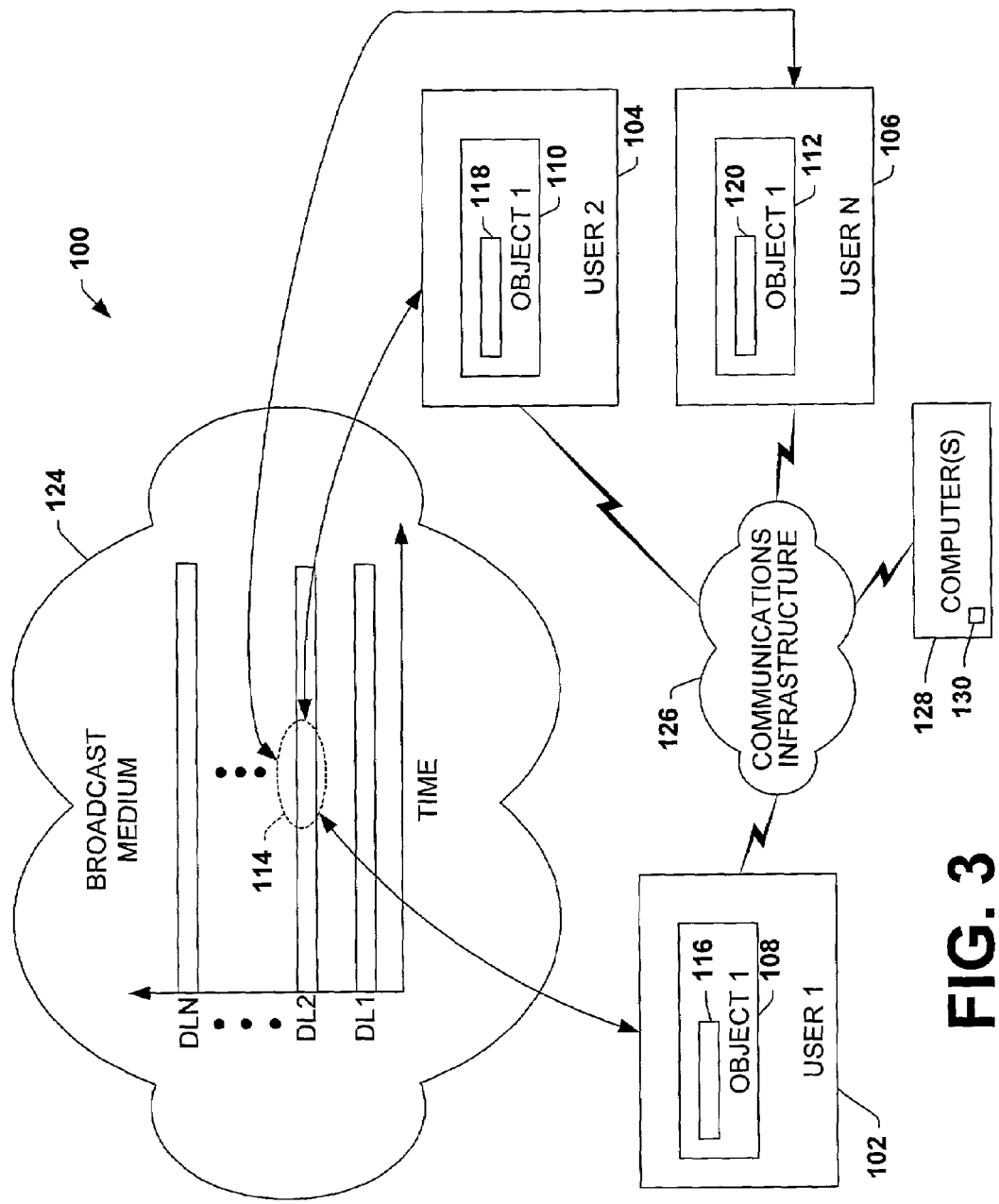
FIG. 3 is an example in which multiple users implement objects to locate data in accordance with the present invention.

FIG. 3 illustrates an example of a system 100 in which more than one user 102, 104, and 106, identified as USER 1 through USER N (where N is an integer $\geq 1$) can utilize respective transportable objects 108, 110, and 112 to locate target data 114 from a temporal presentation of data in accordance with an aspect of the present invention. In this example, the objects 108, 110, and 112 represent the same target data 114, which is broadcast at $DL_2$ over an associated time period. While, for purposes of brevity, one object 108, 110, 112 is illustrated at each user 102, 104, 106, respectively, those skilled in the art will understand and appreciate that each user could have more than one object and that such objects need not represent the same target data 114.

Each of the objects 108, 110, 112 encapsulates metadata 116, 118, 120 that enables each respective user 102, 104, 106 to locate the temporal presentation of the identified target data 114. The extent of the information contained in the metadata 116, 118, 120 may vary as a function of the type of target data 114 and the type of broadcast medium 124 by which each user can access the broadcast. Because the objects enable a user 102, 104, 106 to locate the target data 114 during its broadcast time period, the located target data can be monitored and/or recorded by the user while the target data is broadcast.

In the example of FIG. 3, one or more sources (not shown) broadcast information over the broadcast medium 124. The broadcast medium 124 can be divided into one or more data locations ($DL_1$ to $DL_N$, where N is an integer $\geq 1$), each of which can broadcast content concurrently via the medium 124. The target data 114 is broadcast over a particular time period at data location $DL_2$.

For purposes of simplicity of explanation, the data locations $DL_1$ to $DL_N$ are illustrated as part of a graph that delivers data over time. It is to be appreciated that the data locations can correspond to channels in a radio frequency spectrum (wired or wireless), URLs, or other transmittable units through which data can be broadcast to one or more users. Additionally, while the data content associated with the channels $DL_1$ to $DL_N$ is depicted as being continuous over time, those skilled in the art will understand and appreciate that the content associated with the channels could be non-continuous or interrupted. For example, one or more channels $DL_1$ to $DL_N$ can lie quiescent until the occurrence of a selected event or a condition, which may cause a corresponding broadcast to occur.

The implementation 100 also includes a communications framework 126 that can be employed to facilitate communication between the users 102, 104, and 106. The communication framework 126 also can enable communication between the users 102, 104, and 106 and one or more remote computers 128. In an example where the users 102, 104, and 106, and the computer(s) 128 are distributed between a plurality of physical devices, the communication framework 126 can include, for example, networking hardware and software to enable wired and/or wireless communication between such physical devices.

The computer(s) 128 can include a service or process 130 running thereon that can provide the users 102, 104, and 106 with their respective objects. A user can acquire objects, for example, by downloading initiated by the user and/or by another user or service sending the objects. By way of illustration, the process 130 can contain a list of audio and/or visual programs that are intended to be broadcast in the future, such as according to a defined broadcast schedule. It is to be appreciated that the broadcast schedule for a given program can vary between different local tuning spaces. Accordingly, the metadata 116, 118, and 120 in the objects available from the computer(s) 128 can include specific information about the content of a selected audio and/or visual program (e.g., program title, channel, genre, actors and actresses, description, etc.); however no information about actual time scheduling information for recording need be provided in the metadata. Instead, other services, such as may run in the computer(s) 128 or be otherwise associated with the users 102, 104, and 106, can supplement the metadata 116, 118, and 120 based on the instructions provided at the user. Alternatively, the service 130 can send the objects 108, 110, and 112 to one or more of the users 102, 104, and 106, such as according to a subscription to which the users belong. Because of the transportable nature of the objects, any user 102, 104, 106 can send an object to another user. For example, the object can be sent directly from one of the users 102, 104, 106 or at the request of a user, a service, such as at the computer(s) 128, can send the object to the requested destination.

According to another aspect of the present invention, a transportable object can represent a future temporal broadcast of sensor data over a broadcast medium. The sensor data, for example, may be obtained by one or more sensors or other data collection devices that monitor conditions associated with an entity (e.g., a person, place or thing). By way of illustration, the conditions could include: equipment health and operating status of equipment in a factory; security surveillance video and alarm conditions for a facility; audio and/or video coverage for a facility and/or event; etc. The metadata for such a transportable object may represent the path or location to desired content, access, broadcast window, as well as scheduling information needed to locate the corresponding target data. By employing the object 108, 110, and/or 112 to locate corresponding target data 114, one or more users 102, 104, and 106 can monitor and/or record that piece of content during its broadcast over the broadcast medium 124.

In accordance with another aspect of the present invention, the transportable objects 108, 110, and 112 further includes a representation of recording instructions for a specific data location to facilitate recording of the target data 114 while it is broadcast. The object 108, 110, 112 or an associated method or function can further permit a user to specify various features and/or set parameters associated with the recording that is to be performed. For the example where the target data represents an audio and/or visual program (or a portion of a program), the object and/or its associated application can permit the user to set recording parameters indicating how often to record a given show (e.g., once or daily). The object 108, 110, 112 further can employ a function or method, which is programmed to notify the user (e.g., via email, pager, cell phone, etc.) that the show has successfully recorded. One or more other associated methods or functions further can be called to transfer the show to transportable media (e.g., Flash RAM, DVD, etc.) and/or to erase or archive previous episodes of the recorded program, such as when the program is a series. Those skilled in the art will understand and appreciate other features that can be implemented in conjunction with a transportable object in accordance with the present invention.

Figure 4:
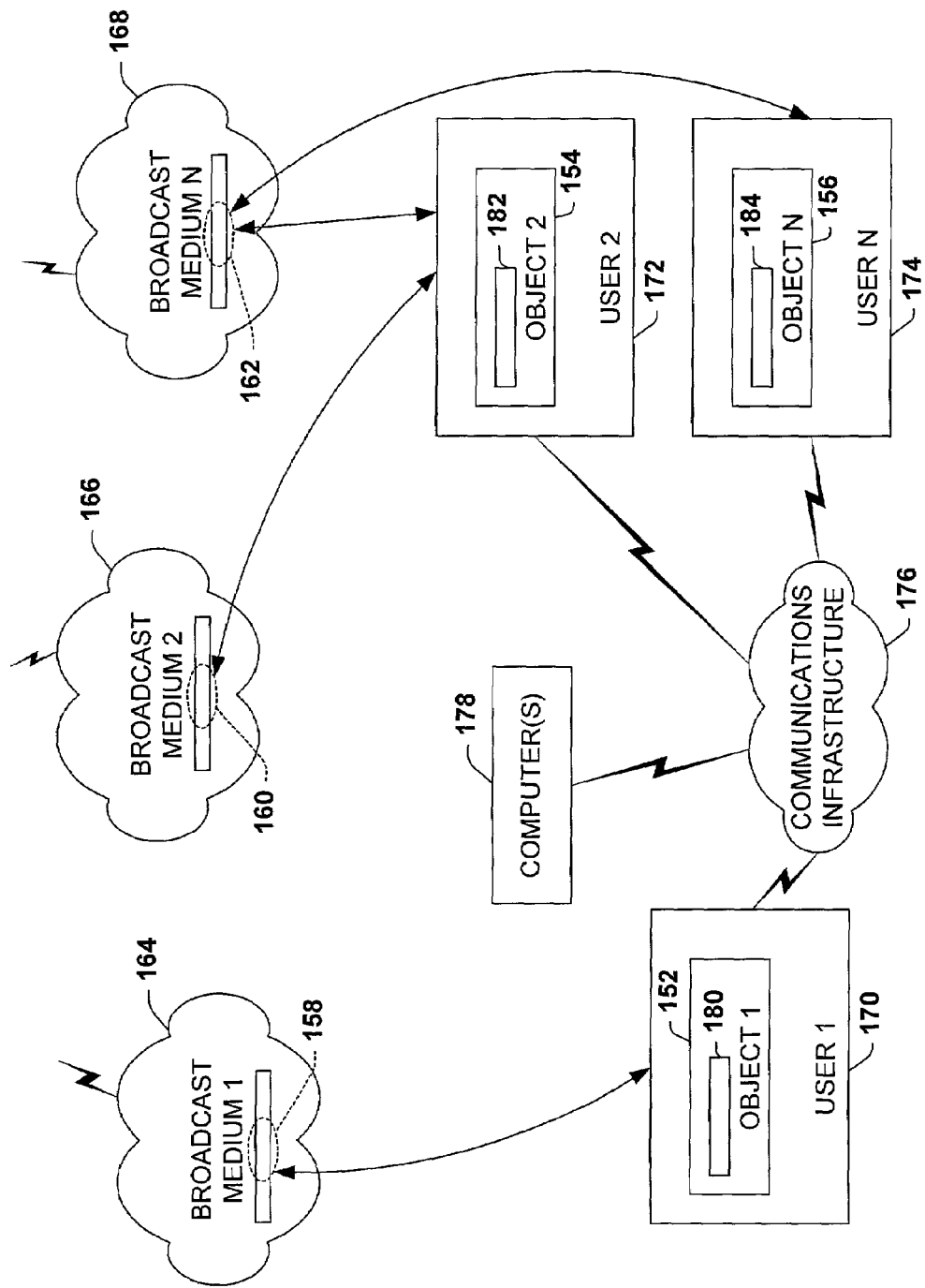
FIG. 4 is another example in which multiple users implement objects to locate data in accordance with the present invention.

FIG. 4 illustrates another implementation 150 in which transportable objects 152, 154, and 156 are employed to locate respective broadcasts of target data 158, 160, and 162 in accordance with an aspect of the present invention. In the example of FIG. 4, each of the objects 152, 154, 156 represents a broadcast of target data 158, 160, 162 over different broadcast media 164, 166, 168. For sake of brevity, the target data 158, 160, and 162 are illustrated as being part of a data stream in corresponding media 164, 166, and 168, although it is to be appreciated that the target data could be broadcast in more than one stream in one or more media. By way of example, each of the broadcast medium 164, 166, 168 can employ different types of content delivery, such as for example, broadband cable, satellite, broadcast radio and/or television, streaming media, etc. The target data 158, 160, and 162 can be the same or different over each medium.

Each of the objects 152, 154, and 156 is illustrated as residing at an associated user 170, 172, and 174. The users 170, 172, and 174 can receive and/or send the transportable objects 152, 154, and 156 via a communications framework 176. For example, such objects 152, 154, and 156 can be obtained from one or more associated computers 178 or from other users.

As mentioned above, the objects 152, 154, and 156 represent target data 158, 160, and 162 that is to be broadcast at some time in the future over corresponding media 164, 166, and 168. Each of the objects 152, 154, and 156 encapsulates respective metadata 180, 182, and 184 that enables the respective users 170, 172, and 174 to locate corresponding target data 158, 160, and 162 when it is broadcast. The metadata 180, 182, and 184 may vary according to the content of the data being broadcast over the respective media and the type of medium. Additionally, the metadata 180, 182, and 184 can include information that facilitates recording and/or monitoring of the target data 158, 160, and 162 represented by the objects 152, 154, and 156, respectively.

In the example of FIG. 4, the object 152 contains metadata 180 that enables the user 170 to locate target data 158 broadcast over the medium 164. Similarly, the object 156 contains metadata 184 that enables the user 174 to locate target data 162 that is broadcast over the medium 168. The object 154 contains metadata 182 that enables the user 172 to locate the target data 160 and 162, which are broadcast over media 166 and 168. That is, metadata encapsulated in a transportable object, in accordance with an aspect of the present invention, can enable a user to locate and store identified target data as it is broadcast over more than one medium. The identified target data further can be broadcast at the same or different times. The user 172 can, in turn, monitor and store the target data as it is broadcast over the media 166 and 168. In order to enable more than one instance of target data to be concurrently received at the user 172, the user may include multiple tuners or communications links for receiving and demodulating data broadcast over each associated medium 166, 168.

Figure 5:
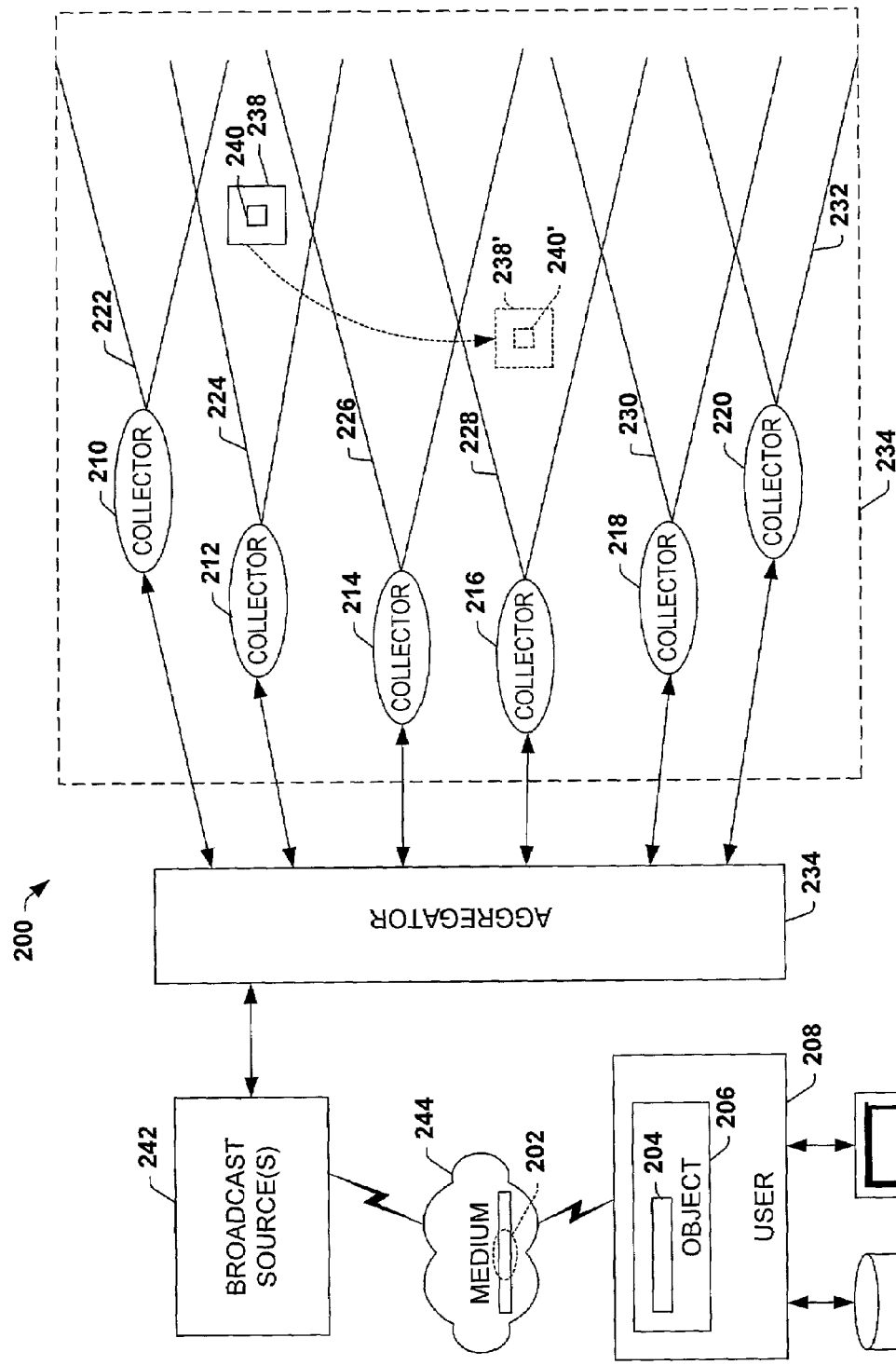
FIG. 5 is an example of a system that implements an object to access data in accordance with the present invention.

FIG. 5 illustrates another example of a system 200 that can be employed to locate a broadcast of target data 202 based on metadata 204 encapsulated within a transportable object 206 in accordance with an aspect of the present invention. In this example, the object is illustrated as residing in a user 208. The user 208 can include hardware and/or software, such as a computer, a process or service running on a computer, an entertainment appliance, a handheld microprocessor-based device (e.g., a cellular telephone, PDA, etc.), or other type of system. While, for purposes of brevity, a single user 208 is illustrated in FIG. 5, it is to be appreciated that any number of one or more such users can be implemented in accordance with an aspect of the present invention.

In accordance with an aspect of the present invention, the transportable object 206 represents target data 202 that is derived by aggregating data collected at a plurality of data collection devices 210, 212, 214, 216, 218, and 220. Each of the data collection devices 210, 212, 214, 216, 218, and 220 collects data indicative of a condition or event associated with a corresponding region 222, 224, 226, 228, 230, and 232. The regions, for example, correspond to different parts of one or more facilities where such collection devices are employed. In the example of FIG. 5, the data collection devices 210, 212, 214, 216, 218, and 220 are located within a facility 234. The data collection devices 210, 212, 214, 216, 218, and 220 provide respective signals to an aggregator 236 indicative of the conditions detected by the respective collection devices.

While in the example of FIG. 5 adjacent regions overlap, it is to be understood that the spatial relationship between regions may vary depending on, for example, the type of data collection device, the desired resolution of the condition being monitored, and/or the particular application in which the data collection devices are being used. Additionally, the aggregator 236 is illustrated as being external to the facility 234; however, it is to be understood and appreciated that the aggregator (or a portion thereof) could also be implemented within the facility in accordance with an aspect of the present invention.

One or more entities 238, such as a person or article, have characteristics that can be detected by the data collection devices 210, 212, 214, 216, 218, and 220. By way of illustration, the data collection devices 210, 212, 214, 216, 218, and 220 include a sensor, a video camera, an audio microphone and/or other components (hardware and/or software) operative to monitor and/or record a condition or event that occurs in the associated regions 222, 224, 226, 228, 230, and 232. The detected characteristics, thus, can include an image, sound, an indication of position and/or movement of the entity 238 and/or an indication of one or more other conditions of the entity (e.g., temperature, vibration, health, status, etc.). For an example where the article 238 is a person, the characteristic can include the position of the person, as represented by video and/or audio of the person. The entity 238 thus can be moveable within the regions 222, 224, 226, 228, 230, and 232 being monitored, such as when the entity moves from a first position (indicated by solid lines) to a second position (indicated by dotted lines) at 236'. The data collection devices 210, 212, 214, 216, 218, and 220 provide the collected data to the aggregator 236.

In accordance with another aspect, the system 200 includes a recognition system operative to determine an identity of the entity. The recognition system, for example, can implement a pattern recognition system capable of discerning the identity of the entity based on part of the data collected by the collection devices 210, 212, 214, 216, 218, and 220. In addition, or alternatively, the recognition system can employ a transmitter associated with the entity to indicate in which region the entity resides In one aspect, the recognition system includes a device 240 operatively associated with the entity 238 to provide information that enables a location of the article to be determined. When the entity 238 is within a sensing region 222, 224, 226, 228, 230, 232 of a respective data collection device 210, 212, 214, 216, 218, 220, that data collection device can provide data to the aggregator 236 indicative of the detected characteristic(s) of the entity. In addition, the recognition system, which may be implemented at the collection devices 210, 212, 214, 216, 218, and 220 and/or the aggregator 236, can stamp the collected data with identifying data. The identifying data, for example, includes information that identifies the time of data collection, an event or condition detected in the collected data, and/or the identity of the entity (or entities) associated with the data being collected. The collected data, which can include the identifying data, is processed at the aggregator.

By way of illustration, the identifying device 240 includes a local transmitter that emits a signal that includes identification data (e.g., a Personal Identification Number (PIN)). The regions 222, 224, 226, 228, 230, and 232 may correspond to different parts of a facility (e.g., daycare, prison, amusement park, etc.), such as where one or more persons meander into and out of the various regions. For example, each data collection device 210, 212, 214, 216, 218, 220 maybe a camera operative to capture an image (still or motion picture) of persons and things located within its associated region. The data collection device(s) 210, 212, 214, 216, 218, and 220 thus can provide a signal to the aggregator corresponding to time-based images of their regions. In one particular aspect, the data collection device 210, 212, 214, 216, 218, 220 provides image data together with identifying data for entities to indicate when they are located within their associated regions. In accordance with an aspect of the present invention, multiple data collection devices could be associated with each region (or the data collection devices could be configured) to collect information about a plurality of different conditions or events that occur in each associated region.

The aggregator 236 can process data from each of the data collection device 210, 212, 214, 216, 218, 220 and aggregate selected parts of the data into a serial data stream, such as based on the identifying data that stamped onto the collected data. The aggregated data, in turn, can be broadcast as the target data 202. For example, collected data that includes a PIN or other identifying data for a particular entity 238 is separated from other collected data having a different or no identifying data. In this way, the aggregator 236 can provide aggregated data as target data of a temporal data stream for each entity 238 (e.g., a person or article) that can be located in the facility 234. Accordingly, the aggregator 236 processes the collected data and creates a temporal data stream that can include target data for each identified entity based on the identifying data associated with the collected data.

The aggregator 236 provides aggregated data to a broadcast source 240, which broadcasts temporal data via one or more broadcast media 242. For example, the broadcast source 240 concurrently broadcasts over television, radio and/or a global communications framework (e.g., the Internet). While one broadcast source 240 is illustrated in FIG. 5, it is to be appreciated the aggregator 234 can provide the aggregated data to any number of one or more such sources. As mentioned above, the user 208 includes the object 206 that represents the target data 202, such that the user can locate the corresponding target data while it is broadcast.

The facility 234 at which the data is collected can send interested persons the objects in advance, so that users of the object can monitor and/or record a future broadcast of data, such as associated with a given entity 238. Because the object 206 is transportable, it can be sent to other interested parties as identified by the user 208, such via a communications framework (not shown, but See, e.g., FIGS. 3–4). The user(s) 208 may employ the object 206 to locate the target data from its corresponding temporal presentation as it is broadcast over the medium 242. As a result, the user(s) 208 can record the target data 202 as it is broadcast via the medium 242 in associated memory 246 and/or monitor the data, such as graphical images on an associated display (e.g., monitor or television) 248. In accordance with an aspect of the present invention, transportable objects can be sent to one or more users so that such users can monitor and/or record the target data from the temporal broadcast(s) associated with a given entity or group of entities.

By way of further example, to provide an added measure of security, the metadata 204 of the object 206 can include authentication data to enable the user 208 to receive and/or properly decode the target data 202. The authentication is useful for circumstances when it is desirable to limit access to the broadcast of the target data 202. For example, it may be desirable to permit selected individuals (e.g., family and friends) to locate certain types of broadcast data, such as when the target data involves children (e.g., activities at a daycare or a school), personal events, etc. The authentication protocol further can be employed to help ensure that only authorized users are able to record and/or monitor certain target data, such as based on subscription rights and payments for selected target data. For example, the authentication data enables the user 208 to appropriate decode and/or demodulate the target data into a user-perceptable form, such as based on a password provided in the object 206.

By way of particular example, a class play or other time-based event is scheduled to occur a given afternoon in the future, but a person is unable to attend the event and watch the program live. Presume that the person has a system according to the present invention. The facility may employ one or more cameras to record the event and broadcast the program live (or delayed) over some broadcast media (e.g., the Internet, a local cable channel). Prior to the event, the school presenting the event (or a service at the facility's instructions), sends a transportable object to selected parties, such as family members, regular attendees, etc. The transportable object includes metadata, as described herein, that enables recipients of the object to locate the subsequent broadcast(s) of the event. The object also can include authentication data (e.g., a password) to enable viewing or access of the associated broadcast(s) of the event, which is to be presented later. The recipients of the objects can forward the object to appropriate family members and friends in other parts of the country, such as by email.

The object further can include or otherwise identify methods or functions for controlling monitoring and/or recording of the broadcast of the event. Upon opening the transportable object, users can adjust the parameters to optimize picture quality for their video/PC configuration and available bandwidth, as well as provide desired alerts, such as a notification as to when the program is completed for viewing. Provided the object has been employed to locate and record the broadcast of the event, in accordance with an aspect of the present invention, the associated hardware and/or software will proceed to find the broadcast presentation of target data based on the media captured by the cameras. The user hardware and/or software further can record and store the target data for the play to include audio-visual data captured by all the cameras. After or during the broadcast, one can pick and choose best view, such as to see a desired participant of the event, and transfer their selections to their home server which copies over the edited version based on the selections of the best view.

Figure 6:
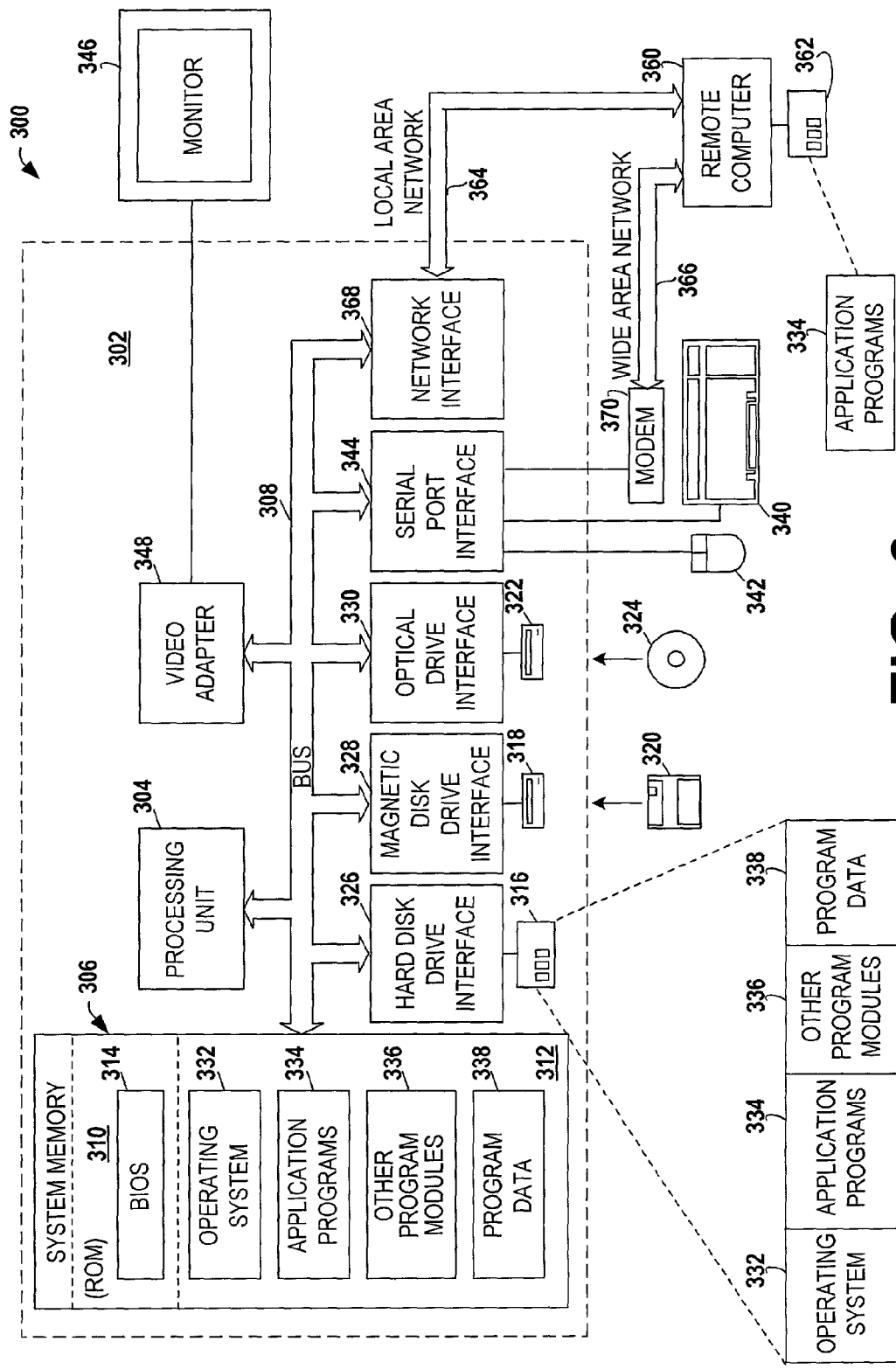
FIG. 6 is an example of an operating environment that may utilize an object to locate data in accordance with the present invention.

In order to provide additional context for various aspects of the present invention, FIG. 6 and the following discussion are intended to provide a brief, general description of one possible suitable environment 300 in which the various aspects of the present invention may be implemented. It is to be appreciated that the computing environment 300 is but one possible computing environment and is not intended to limit the environments with which the present invention can be employed. Those skilled in the art will appreciate that the inventive methods can be practiced with other system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention can also be practiced in distributed computing environments where certain tasks are performed by remote processing devices that are linked through a communications network. In a distributed computing environment, program modules may be located in both local and remote memory storage devices. The illustrative environment 300 generally relates to a personal computer 302, although it will be apparent that various other types of equipment may utilize a transportable object, in accordance with an aspect of the present invention.

While various aspects of the present invention have been described above in the general context of computer-executable instructions that may run on one or more computers or other microprocessor-based equipment, it is to be recognized that the invention also may be implemented in combination with other program modules and/or as a combination of hardware and software. Generally, program modules include routines, programs, components, data structures, etc. that perform particular tasks or implement particular abstract data types.

FIG. 6 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 6, the exemplary environment 300 for implementing various aspects of the invention includes a computer 302, including a processing unit 304, a system memory 306, and a system bus 308 that couples various system components including the system memory to the processing unit 304. The processing unit 304 may be any of various commercially available processors. Dual microprocessors and other multi-processor architectures also can be used as the processing unit 304. The computer 302 and/or portions thereof may be implemented as any electronic appliance operable to communicate with a Web-based service, such as, for example, a telephone (wired or wireless), a personal computer (PC) (e.g., handheld, desktop, portable, etc.), a roaming PC, a PDA, or any other suitable microprocessor-based appliance.

The system bus 308 may be any of several types of bus structure including a memory bus or memory controller, a peripheral bus, and a local bus using any of a variety of commercially available bus architectures. The system memory 306 includes read only memory (ROM) 310 and random access memory (RAM) 312. A basic input/output system (BIOS) 314, containing the basic routines that help to transfer information between elements within the computer 302, such as during start-up, is stored in ROM 312.

The computer 302 may further include a hard disk drive 316, a magnetic disk drive 318, e.g., to read from or write to a removable disk 320, and an optical disk drive 322, e.g., for reading and/or writing data relative to 324 optical media. The hard disk drive 316, magnetic disk drive 318, and optical disk drive 322 are connected to the system bus 308 by a hard disk drive interface 326, a magnetic disk drive interface 328, and an optical drive interface 330, respectively.

The computer 302 typically includes at least some form of computer readable media. Computer readable media can be any available media that can be accessed by the computer 302. By way of example, computer readable media may comprise computer storage media and communication media. Computer storage media may include volatile and nonvolatile, removable and non-removable media implemented in any method or technology for storage of information such as computer readable instructions, data structures, program modules, or other data. Computer storage media may include RAM, ROM, EEPROM, flash memory or other memory technology, CD-ROM, digital versatile disks (DVD), or other magnetic storage devices, or any other medium which can be used to store the desired information and which can be accessed by the computer 302. Communication media typically embodies computer readable instructions, data structures, program modules or other data in a modulated data signal such as a carrier wave or other transport mechanism and includes any information delivery media. A modulated data signal includes a signal that has one or more of its characteristics set or changed in such a manner as to encode information provided in the signal. By way of example, communication media may include wired media such as a wired network or direct-wired connection, and wireless media such as acoustic, RF, optical and other wireless media. Combinations of any of the above should also be included within the scope of computer readable media.

A number of program modules may be stored in the drives and RAM 312, including an operating system 332, one or more application programs 334, other program modules 336, and program non-interrupt data 338. The operating system 332 in the illustrated computer can be any of a number of commercially available or proprietary operating systems.

A user may enter commands and information into the computer 302 through a keyboard 340 and a pointing device, such as a mouse 342. Other input devices (not shown) may include a microphone, an IR remote control, a joystick, a game pad, a satellite dish, a scanner, or the like. These and other input devices are often connected to the processing unit 304 through a serial port interface 344 that is coupled to the system bus 308, but may be connected by other interfaces, such as a parallel port, a game port, a Universal Serial Bus ("USB"), an IR interface, etc. A monitor 346, or other type of display device, is also connected to the system bus 308 via an interface, such as a video adapter 348. In addition to the monitor, a computer typically includes other peripheral output devices (not shown), such as speakers, printers etc.

The computer 302 may operate in a networked environment using logical connections to one or more remote computers, such as a remote computer(s) 360. The remote computer(s) 360 may be a workstation, a server computer, a router, a personal computer, a microprocessor based entertainment appliance, a peer device, or other common network node. The remote computer may include many or all of the elements described relative to the computer 302, although, for purposes of brevity, only a memory 362 is illustrated. The logical connections depicted include a local area network (LAN) 364 and a wide area network (WAN) 366, such as the Internet. Such networking environments are commonplace in offices, enterprise-wide computer networks, intranets, and the Internet.

When used in a LAN networking environment, the computer 302 is connected to the local network 364 through a network interface or adapter 368. When used in a WAN networking environment, the computer 302 typically includes a modem 370, or is connected to a communications server on the LAN, or has other means for establishing communications over the WAN 366. The modem 370, which may be internal or external relative to the computer 302, is connected to the system bus 308 via the serial port interface 344. In a networked environment, program modules 336, application programs, or portions thereof, may be stored in the remote memory storage device 362. Similarly, when the computer 302 stores target data, such data may be stored in memory 326, 328, 330 of the computer or remote memory 362. It will be appreciated that the network connections shown are exemplary and other means of establishing a communications link between the computers may be used.

Figure 7:
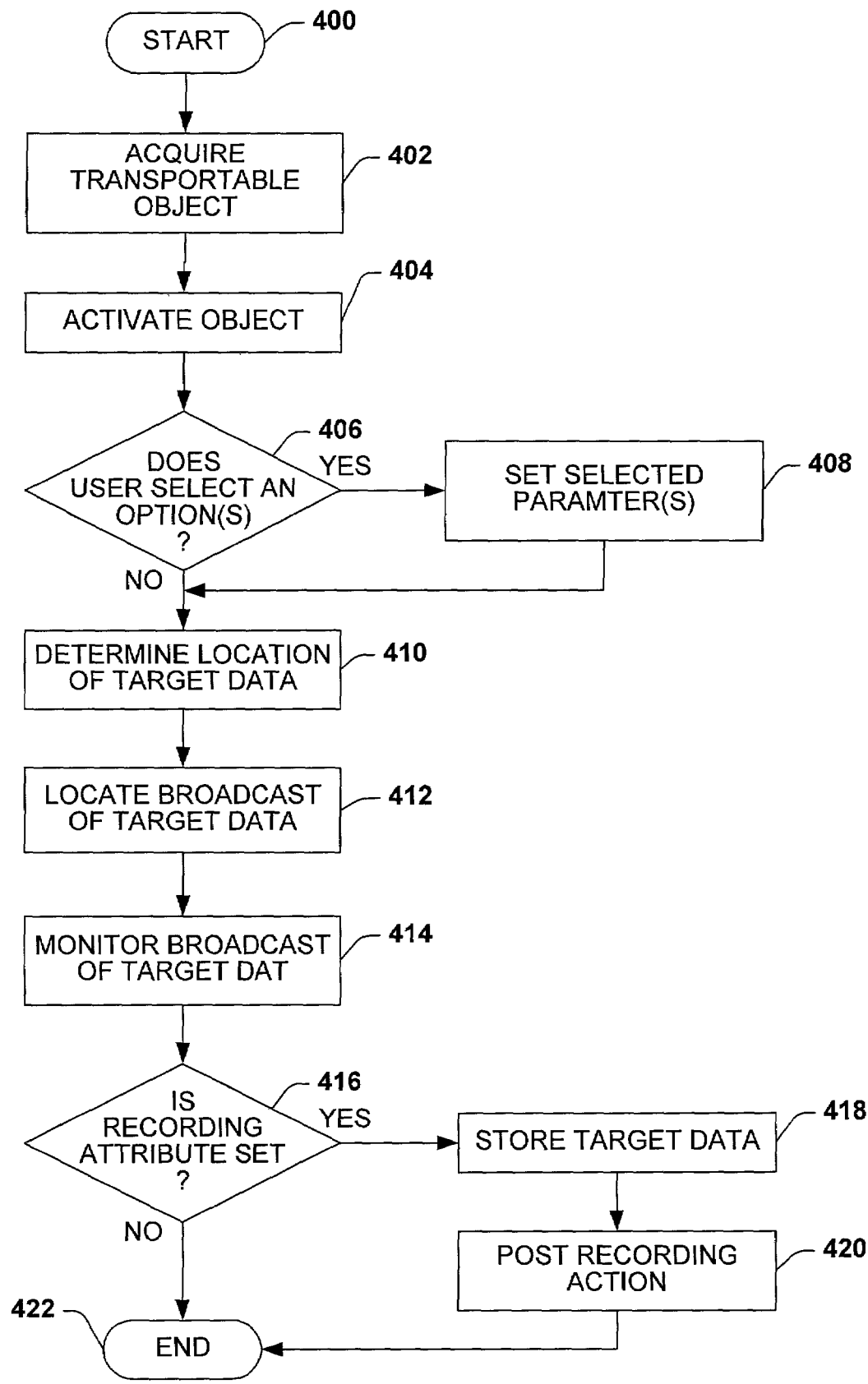
FIG. 7 is a flow diagram illustrating a methodology to locate part of a data stream in accordance with the present invention.

In view of the exemplary systems and features shown and described above, methodologies, which may be implemented in accordance with the present invention, will be better appreciated with reference to the flow diagrams of FIG. 7. While, for purposes of simplicity of explanation, the methodology is shown and described implementing serially, it is to be understood and appreciated that the present invention is not limited by the illustrated order, as some aspects may, in accordance with the present invention, occur in different orders and/or concurrently with other blocks from that shown and described herein. Moreover, not all illustrated features may be required to implement a methodology in accordance with the present invention.

The methodology may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired.

FIG. 7 illustrates a methodology to locate target data in a temporal broadcast in accordance with the present invention. The methodology begins at 400 in which general initializations occur, such as upon activating a system that is to implement the methodology. Such initializations include, for example, allocating memory, establishing pointers, establishing data communications, acquiring resources, instantiating objects and setting initial values for variables. Next, at 402, a transportable object is acquired. The object, for example, may be obtained via a communications framework implementing an associated communications protocol. For example, the object maybe downloaded from a sever, sent (e.g., as part of an email message) from a friend or family member, provided to a user from a subscription service to which the user belongs, etc. The object represents target data that is to be broadcast at some time in the future. In particular, the transportable object includes metadata that identifies the broadcast of the target data with sufficient particularity so that the temporal presentation of target data may be located. The particular information included in the metadata may vary according to the type of target data represented by the object and the media over which a user may access such data. For an example of audio and/or video programming, the metadata may include specific information about the program content (e.g., title, producer, actors and actresses) and none about actual time scheduling information for recording. For an example where the object represents for sensor data, the metadata may identify the path or location to content, access, broadcast window, and/or scheduling information needed for locating and recording and/or monitoring the corresponding target sensor data.. The metadata further may include authentication information to enable monitoring and/or recording of the target data and/or playback of recorded data.

At 404, the transportable object is activated or opened. For example, such activation may implement a graphical user interface that provides selectable options to a user relating to the target data represented by the object. At 406, a determination is made as to whether any of the selectable options have been set by the user. By way of example, the options may include parameters that control recording (e.g., how often to record a program), an option to notify the user after the target data has been stored in a readily accessible form, an instruction to transfer recorded target data to a different computer-readable medium (e.g., Flash ROM). Another option may include sending the transportable object to one or more other users, such as an email attachment or as part of another type of message. It is to be appreciated that the transportable object may be sent and/or received by any communications modality, both wired and wireless. In addition, a user or service may send or forward the object to intended users without activating the object, such as by employing communications means (hardware and/or software) associated with the sender's equipment.

If one or more object-related option has been selected (406), the methodology proceeds to 408, in which appropriate parameters, attributes and properties are set to carry out the selected action. The methodology then proceeds to 410. If the determination at 406 is negative, indicating that no options have been set to conditions different from their default conditions, the methodology also proceeds to 410.

At 410, the location of the target data is determined based on the metadata encapsulated within the object. As mentioned above, the location may vary according to the type of data being broadcast and/or the equipment being employed to access and obtain the broadcast. That is, the object and associated metadata are employed to locate the time and location at which the target data is broadcast. For example, a location resolution algorithm may be employed, which determines the location and time when the target data will be broadcast over an associated medium. The algorithm may vary according to the medium over which the target data is to be broadcast and/or the type of content. At 412, after the broadcast location for the target data has been determined, the temporal broadcast of the target data is located. Because the broadcast time (and/or location) may not be absolutely discernable before the broadcast begins, the user may receive and buffer the data broadcast at the determined broadcast location beginning at an approximate time until the desired target data is detected. For example, the broadcaster may provide metadata, such as a schedule or notification, within the broadcast data indicating when new data is to be broadcast. The user may employ such broadcast metadata to capture the identified target media.

At 414, the broadcast of the target data may be monitored. The monitoring may include presenting the data in human-perceivable media at an appropriate interface, such as a monitor, television, radio, or other display device. Alternatively or additionally, the target data (e.g., sensor data) may be presented in a machine-readable format, which may be processed to evaluate and report on information contained in the target data. The report may, in turn, be presented in a human readable media. From 414, the methodology proceeds to 416.

At 416, a determination is made as to whether the target data has been slated for recording or storing. If the determination is affirmative, the methodology proceeds to 418 in which the real-time broadcast of the target data is recorded or stored. The recording, for example, may occur locally in a local storage device and/or remotely at an associated data storage system (e.g., part of a storage area network or remote storage device). After the target data has been recorded, post-recording actions are implemented at 418. The post-recording action, for example, may include operations selected by the user at 406 and/or other operations associated with notification, storing the target data, and/or archiving and moving other stored data. It is to be appreciated that the recording may occur concurrently with the monitoring (414), although subsequent monitoring or playback of the recorded target data also may occur. By storing the broadcast target data, a time-shifting function is provided in which a user may monitor the target data at a more convenient time.

From 420 the methodology ends at 422. Similarly, if the target data is not recorded (a negative determination at 416), the methodology also advances from 416 to end at 422.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system to facilitate capture of desired broadcast data, comprising:

a transportable object that represents a future temporal broadcast of target data to facilitate data communications between users of the transportable object;

metadata encapsulated within the transportable object that describes a location of the broadcast of the target data so as to enable at least one of monitoring and recording of the target data during broadcast; and a recognition system that identifies identity of an entity based on a pattern of characteristics associated with the entity.

2. The system of claim 1, the broadcast of the target data corresponding to a substantially real-time broadcast of data associated with an event or condition.

3. The system of claim 2, the data associated with an event or condition characterizing a previous occurrence of the event or condition.

4. The system of claim 2, the data associated with an event or condition characterizing a substantially live occurrence of the event or condition.

5. The system of claim 2, further comprising:
at least one data collection device that collects data indicative of the event or condition and provides a data signal indicative thereof; and
a broadcaster that broadcasts a data stream that includes the target data, the target data being derived at least in part based on the data signal.

6. The system of claim 2, further comprising
a plurality of data collection devices that collect data indicative of the event or condition;
the collection devices providing data signals indicative of the collected data;
an aggregator that selectively aggregates data based on the data signals provided by the collection devices to provide aggregated data; and
at least a portion of the aggregated data defining the target data represented by the object.

7. The system of claim 1, the recognition system discern identity of an entity and stamps part of collected data with identifying data indicative of the identity of the entity so as to provide entity-specific data.

8. The system of claim 7, further comprising a multiplexer which separates collected data that is associated with the identity of the entity from other collected data to provide identity-specific data based on the identifying data, the aggregator aggregating the collected data so that the at least a portion of the aggregated data includes the entity-specific data.

9. The system of claim 1, the broadcast of the target data occurring substantially independently from use of the object to locate the target data.

10. The system of claim 1, the target data representing at least one of audio data, video data, and sensor data.

11. A system to facilitate access to a presentation of data, comprising;
N number of sources that collect data, N being an integer ≧1;
a recognition system that identifies identity of an entity based on a pattern of characteristics associated with the entity;
an identification system that stamps portions of the collected data with identifying data based on at least one of time, an event or condition, and the entity to provide stamped data;
an aggregator that aggregates portions of the stamped data and provides aggregated data; and
a transportable identifier that identifies a location associated with a temporal presentation of at least a selected portion of the aggregated data, the transportable identifier facilitates data communications among multiple users of the transportable identifier.

12. The system of claim 11, the collected data further comprising at least one of audio and video media.

13. The system of claim 12, further comprising:
a recognition system operative to recognize an identity of an entity being captured as the media by the N sources;
a multiplexer operative to separate captured media associated with the entity from other captured media collected by the N sources; and
the aggregator being operative to aggregate the collected data so that the selected portion of the aggregated data includes the captured media associated with the entity.

14. The system of claim 11, the temporal presentation corresponding to a substantially real-dine broadcast of data associated with an event or condition.

15. The system of claim 14, the temporal presentation being derived from stored data associated with a previous occurrence of the event or condition.

16. The system of claim 14, the temporal presentation corresponding to a substantially live occurrence of the event or condition.

17. The system of claim 11, the temporal presentation occurring substantially independently from use of the transportable identifier.

18. The system of claim 11, the transportable identifier data representing at least one of audio data, video data, and sensor data embodied in the temporal presentation.

19. A system to facilitate access to a temporal presentation of data, comprising:
N number of sources that collect data, N being an integer ≧1;
a recognition component that based on a pattern of characteristics determines identity of an entity;
an identification system that stamps portions of the collected data with identifying data to provide stamped data, the identifying data identifies portions of the collected data associated with an entity;
a multiplexer that separates stamped data associated with the entity from other of the collected data based on the identifying data;
an aggregator that aggregates the collected data to provide aggregated data; and
a transportable identifier that identifies a location associated with a temporal presentation of at least a selected portion of the aggregated data that includes data associated with the entity, the transportable identifier facilitates communication of information between users of the transportable identifier.

20. A system to facilitate access to data, comprising:
means for representing a temporal broadcast of target data, the means for representing being transportable;
means for encapsulating information within the means for representing, the encapsulated information enabling the temporal broadcast of the target data to be located, such that at least one of monitoring and recording of the target data during the temporal broadcast thereof is enabled;
means for evaluating a pattern relating to characteristics of an entity and determining identity of the entity intended to receive the target date; and
means for enabling recipients of the encapsulating information to communicate data amongst themselves.

21. The system of claim 20, further comprising means for transporting the means for representing to an intended user, such that the user can employ the means for representing to at least one of monitor and record the target data during the temporal broadcast thereof.

22. A system to facilitate capture of desired broadcast data, comprising:
- a transportable object that represents a future temporal broadcast of target data and facilitates communication of data between recipients of the transportable object; the broadcast of the target data occurring substantially independently from use of the object;
- metadata encapsulated within the transportable object, the metadata includes information that describes the location of the broadcast of the target data so as to facilitate at least one of monitoring and recording of the target data during broadcast; and
- a pattern recognition component that evaluates a pattern relating to characteristics of an entity associated with the target data and identifies the entity.

23. A method to facilitate at least one of monitoring and recording a temporal presentation of target data, comprising:
- providing a transportable identifier that represents the target data; the identifier including metadata that identifies a future temporal presentation of the target data;
- locating the temporal presentation of the target data based on the metadata so that the target data can be at least one of monitored and recorded during the temporal presentation; and
- detecting a pattern tat is based on characteristics of an entity associated with the target data to discern an identity of the entity.

24. The method of claim 23, further comprising:
- collecting data associated with at least one of an event and condition;
- providing a data signal based on the collected data; and
- selectively aggregating data based on the data signal, at least a portion of the aggregated data defining the target data represented by the object.

25. The method of claim 24, further comprising:
- recognizing which portions of the collected data are associated with an entity;
- separating the collected data associated with the entity from other of the collected data; and
- aggregating the collected data so that the at least a portion of the aggregated data includes the collected data associated with the entity.

26. The method of claim 24, wherein the collected data represents at least one of audio, video and sensor data.

* * * * *